(12) United States Patent
Kim

(10) Patent No.: US 9,361,731 B2
(45) Date of Patent: Jun. 7, 2016

(54) METHOD AND APPARATUS FOR DISPLAYING VIDEO ON 3D MAP

(71) Applicant: HANWHA TECHWIN CO., LTD., Changwon-Si (KR)

(72) Inventor: Sung-Duck Kim, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 245 days.

(21) Appl. No.: 13/935,689

(22) Filed: Jul. 5, 2013

(65) Prior Publication Data

US 2014/0192055 A1    Jul. 10, 2014

(30) Foreign Application Priority Data

Jan. 8, 2013    (KR) .................. 10-2013-0002224

(51) Int. Cl.
*G06T 19/00* (2011.01)
(52) U.S. Cl.
CPC .................................. *G06T 19/006* (2013.01)
(58) Field of Classification Search
None
See application file for complete search history.

(56) References Cited

U.S. PATENT DOCUMENTS

| 4,935,879 A * | 6/1990 | Ueda ............................. 345/552 |
| 6,674,430 B1 * | 1/2004 | Kaufman ............. G06T 15/005 345/419 |
| 6,677,967 B2 * | 1/2004 | Sawano et al. ................ 715/839 |
| 8,339,394 B1 * | 12/2012 | Lininger ........................ 345/419 |
| 2011/0193859 A1 | 8/2011 | Kim et al. |
| 2012/0019627 A1 | 1/2012 | Choi et al. |

FOREIGN PATENT DOCUMENTS

| JP | 2010-224919 A | 10/2010 |
| KR | 10-2009-0070418 A | 7/2009 |
| KR | 10-2010-0109257 A | 10/2010 |
| KR | 10-2011-0092592 A | 8/2011 |
| KR | 10-1204080 B1 | 11/2012 |

OTHER PUBLICATIONS

Sawhney et al. "Video flashlights: real time rendering of multiple videos for immersive model visualization." ACM International Conference Proceeding Series. vol. 28. 2002.*

* cited by examiner

*Primary Examiner* — Kee M Tung
*Assistant Examiner* — Xin Sheng
(74) *Attorney, Agent, or Firm* — Sughrue Mion, PLLC

(57) ABSTRACT

Exemplary embodiments disclose a method of projecting an image onto a surface of a three-dimensional (3D) electronic map. The method includes: extracting nearest intersecting points for each of a plurality of virtual view angle vectors with respect to a position of a virtual photographing apparatus and a plurality of polygons that constitute the 3D electronic map; comparing 3D coordinates of the extracted nearest intersecting points and 3D coordinates of a plurality of pixels constituting the plurality of polygons to select pixels that are within a range of the 3D coordinates of the extracted nearest intersecting points; converting 3D coordinates of the selected pixels to two-dimensional (2D) coordinates to display the selected pixels on a 2D display; and superimposing an input image on top of the selected pixels to output the superimposed image in real-time.

20 Claims, 11 Drawing Sheets

METHOD AND APPARATUS FOR
DISPLAYING VIDEO ON 3D MAP

CROSS-REFERENCE TO RELATED PATENT
APPLICATION

This application claims priority from Korean Patent Application No. 10-2013-0002224, filed on Jan. 8, 2013, in the Korean Intellectual Property Office, the disclosure of which is incorporated herein in its entirety by reference.

BACKGROUND

1. Field

Exemplary embodiments relate to a method of projecting an image on a surface of a three-dimensional map (3D map). More particularly, exemplary embodiments relate to a method of projecting an image obtained by capturing a predetermined area, on a 3D map in real-time.

2. Description of the Related Art

Referring to FIG. 1, in the related art, when a monitor image 110, obtained by capturing a predetermined area 101, is displayed on a map, the monitor image 110 is always projected on a predetermined position on a map in two-dimensional (2D) manner, regardless of whether the map is 2D or three-dimensional (3D).

As a result, it is difficult to accurately determine which portion of a map 100 corresponds to the projected image 110. In addition, connectivity between the image 110 and the map 100 is low. Thus, it is difficult to determine which portion on the map 100 corresponds to the monitor image 110. Therefore, the effectiveness of the monitoring is reduced.

SUMMARY

Exemplary embodiments may relate to a method and apparatus for displaying a captured image on a three-dimensional (3D) map by projecting the captured monitor image to a corresponding portion in the 3D map. Thus, connectivity is increased between the map and the monitor image.

Exemplary embodiments may also relate to a method and apparatus for displaying a captured image on a 3D map by projecting a captured image to a corresponding portion of the 3D map. Thus, the 3D map and the monitor image are integrated.

According to an aspect of the exemplary embodiments, there is provided a method of displaying a captured image onto a three-dimensional (3D) electronic map, the method comprising: determining a position of a virtual photographing apparatus within the 3D electronic map corresponding to a position on which a real photographing apparatus is installed in a real world environment; extracting nearest intersecting points, which are positioned on a plurality of virtual view angle vectors, and each of which intersects one of a plurality of polygons constituting the 3D electronic map in a region around the real photographing apparatus or the virtual photographing apparatus, wherein the plurality of virtual view angle vectors are generated based on view angle information of the virtual photographing apparatus and the position of the virtual photographing apparatus; selecting pixels that are within a range of coordinates of the extracted nearest intersecting points by comparing 3D coordinates of the extracted nearest intersecting points and 3D coordinates of a plurality of pixels constituting the plurality of polygons; converting 3D coordinates of the selected pixels to two-dimensional (2D) coordinates in order to display the selected pixels on a 2D display; superimposing an image captured by the real photographing apparatus on top of the selected pixels, using the converted 2D coordinates of the selected pixels; and outputting, in real-time, the 3D electronic map, including the superimposed image, on the 2D display According to another aspect of the exemplary embodiments, there is provided an apparatus for displaying a captured image onto a three-dimensional (3D) electronic map, comprising: a reference setting device configured to determine a position of a virtual photographing apparatus within the 3D electronic map corresponding to a position on which a real photographing apparatus is installed in a real world environment; an intersecting point extracting device configured to extract a nearest intersecting point which is positioned on each of a plurality of virtual view angle vectors each of which intersects one of a plurality of polygons constituting the 3D electronic map in a region around the real photographing apparatus or the virtual photographing apparatus, wherein the plurality of virtual view angle vectors are generated based on view angle information of the virtual photographing apparatus and the position of the virtual photographing apparatus; a selecting device configured to select pixels that are within a range of coordinates of the extracted nearest intersecting points by comparing 3D coordinates of the extracted nearest intersecting points and 3D coordinates of a plurality of pixels constituting the plurality of polygons; a converting device configured to convert 3D coordinates of the selected pixels to two-dimensional (2D) coordinates of the selected pixels in order to display the selected pixels on a 2D display; an image superimposing device configured to superimpose an image captured by the real photographing apparatus on top of the selected pixels, wherein the superimposing device uses the converted 2D coordinates of the selected pixels; and an output device configured to output, in real-time, the 3D electronic map, including the superimposed image, on the 2D display in real-time.

According to another aspect of the exemplary embodiments, there is provided a system for displaying a captured image onto a three-dimensional (3D) electronic map, comprising: a map server configured to store data of the 3D electronic map, wherein the 3D electronic map consists of a plurality of polygons; a real photographing apparatus configured to photograph a monitor area; and an image superimposing apparatus configured to superimpose an image captured by the real photographing apparatus with a position on the 3D electronic map, wherein the image superimposing apparatus comprises: a reference setting device configured to determine a position of a virtual photographing apparatus within the 3D electronic map corresponding to a position on which a real photographing apparatus is installed in a real world environment; an intersecting point extracting device configured to extract nearest intersecting points which are positioned on a plurality of virtual view angle vectors and each of which intersect the respective plurality of polygons, wherein the plurality of virtual view angle vectors are generated based on view angle information of the virtual photographing apparatus and the position of the virtual photographing apparatus; a selecting device configured to select pixels that are within a range of coordinates of the extracted nearest intersecting points by comparing 3D coordinates of the extracted nearest intersecting points and 3D coordinates of a plurality of pixels constituting the plurality of polygons; a converting device configured to convert 3D coordinates of the selected pixels to two-dimensional (2D) coordinates of the selected pixels in order to display the selected pixels on a 2D display; an image superimposing device configured to superimpose an image captured by the real photographing apparatus on top of the selected pixels, wherein the superimposing device uses the converted 2D coordinates of the selected pixels; and an output device configured to output, in real-time, the 3D electronic map, including the superimposed image, on the 2D display.

BRIEF DESCRIPTION OF THE DRAWINGS

The above and other features and advantages of the exemplary embodiments will become more apparent by describing in detail exemplary embodiments thereof with reference to the attached drawings in which.

DETAILED DESCRIPTION OF THE EXEMPLARY EMBODIMENTS

Figure 1:
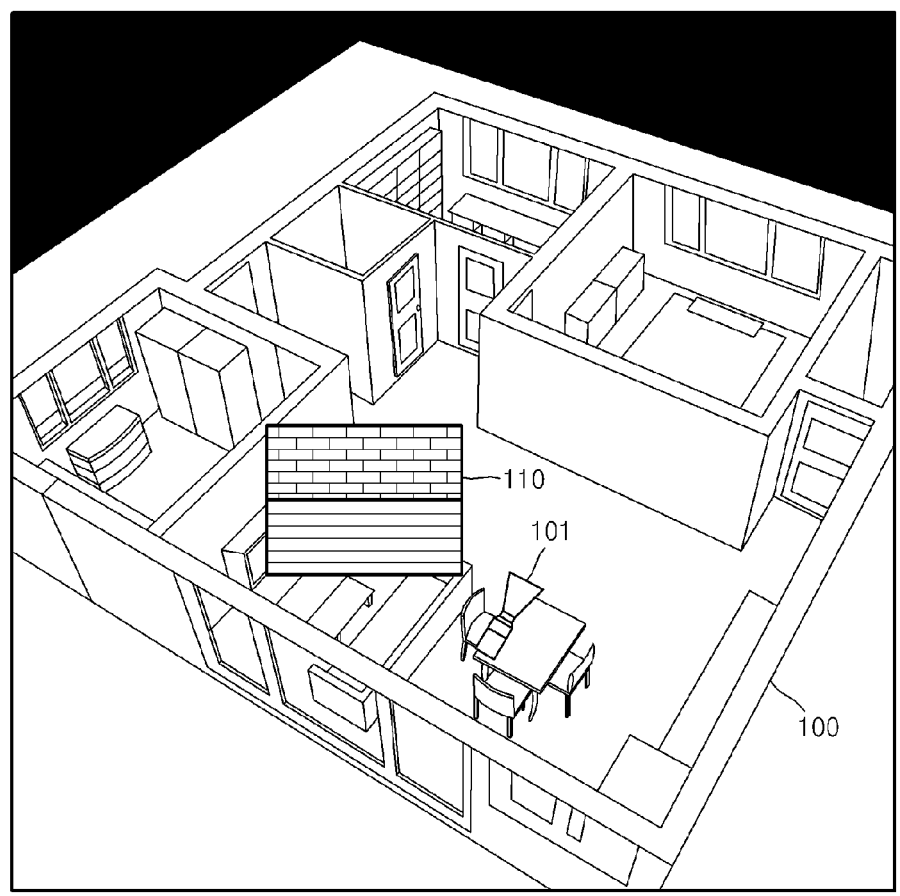
FIG. 1 illustrates a monitor image according to the related art.

Hereinafter, exemplary embodiments will be described in detail with reference to the accompanying drawings. In the drawings, like elements are labeled by like reference numerals even when they are illustrated on different drawings.

In the description of the exemplary embodiments, certain detailed explanations of related art are omitted when it is deemed that they may unnecessarily obscure the essence of the exemplary embodiments.

In addition, it should be noted that in order for this disclosure to be thorough with respect to the exemplary embodiments, modifications of the embodiments of the exemplary embodiments by one of ordinary skill in the art may be implemented without departing from the range of the exemplary embodiments.

FIG. 1 illustrates a monitor image 110 according to the related art.

According to the related art, each time the monitor image 110, obtained by capturing a predetermined area 101, is displayed on a map 100, the monitor image 110 is always displayed in a two-dimensional (2D) manner on a predetermined position on the map 100. As a result, it is difficult to locate which portion of the map 100 is being displayed in the monitor image 110.

Figure 2:
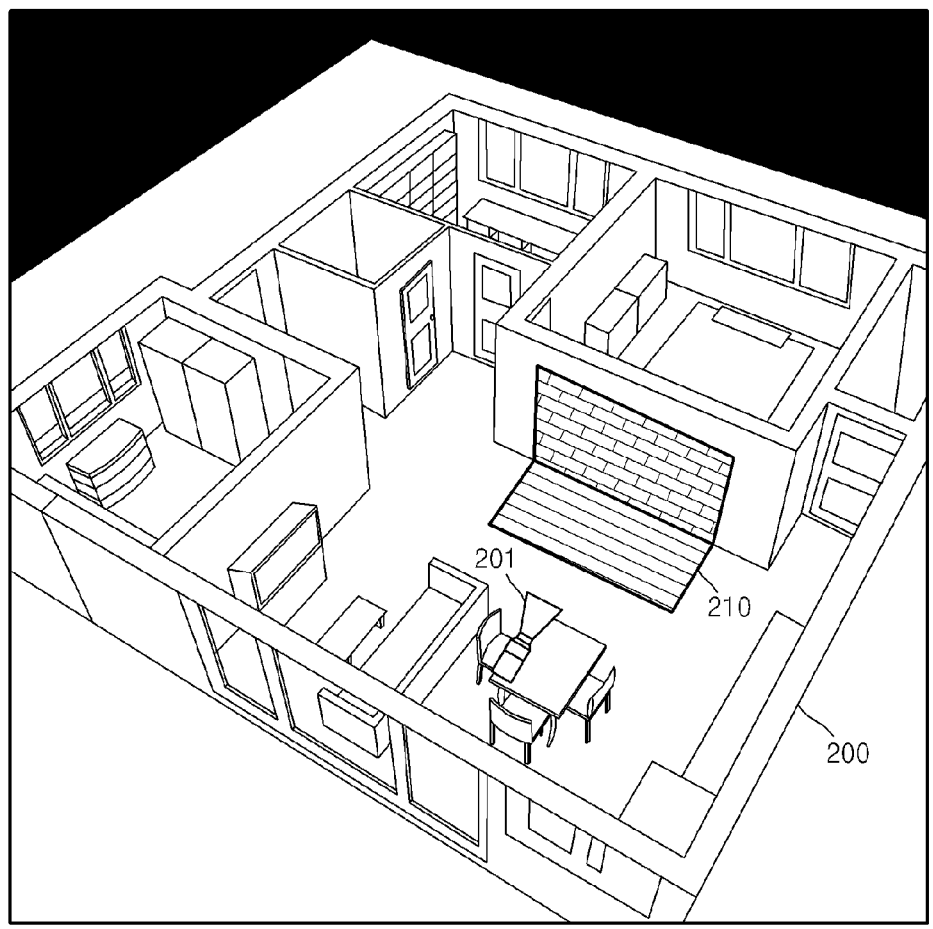
FIG. 2 illustrates a monitor image and a map that are integrated with each other according to an embodiment.

FIG. 2 illustrates a monitor image 210 and a three-dimensional (3D) map 200, which integrated with each other according to an exemplary embodiment.

According to an exemplary embodiment, the difficulty in FIG. 1 of determining which portion of a map corresponds to a monitor image is solved in FIG. 2. Further, as illustrated in FIG. 2, the exemplary embodiments may provide a method of projecting the monitor image 210, which is captured at a predetermined point or a point 201 set by a user, on a corresponding portion of the 3D map 200.

Figure 3:
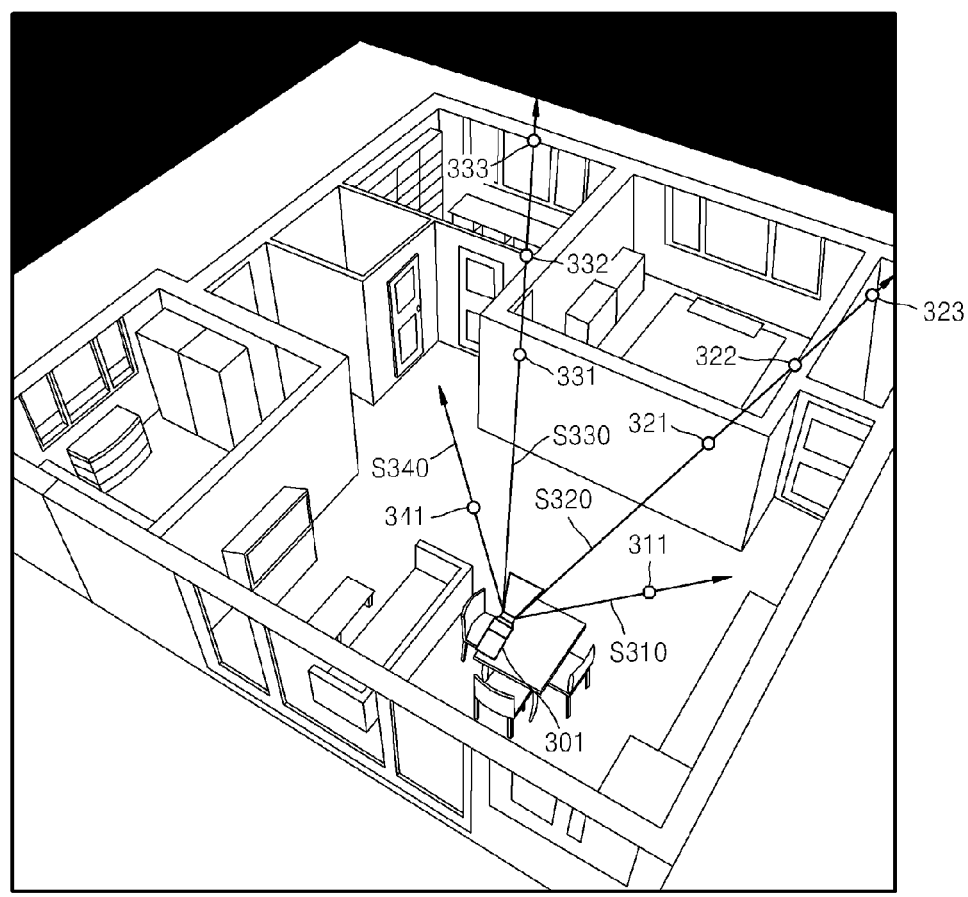
FIGS. 3 and 4 illustrate an operation of setting a nearest intersecting point according to embodiments.
Figure 4:
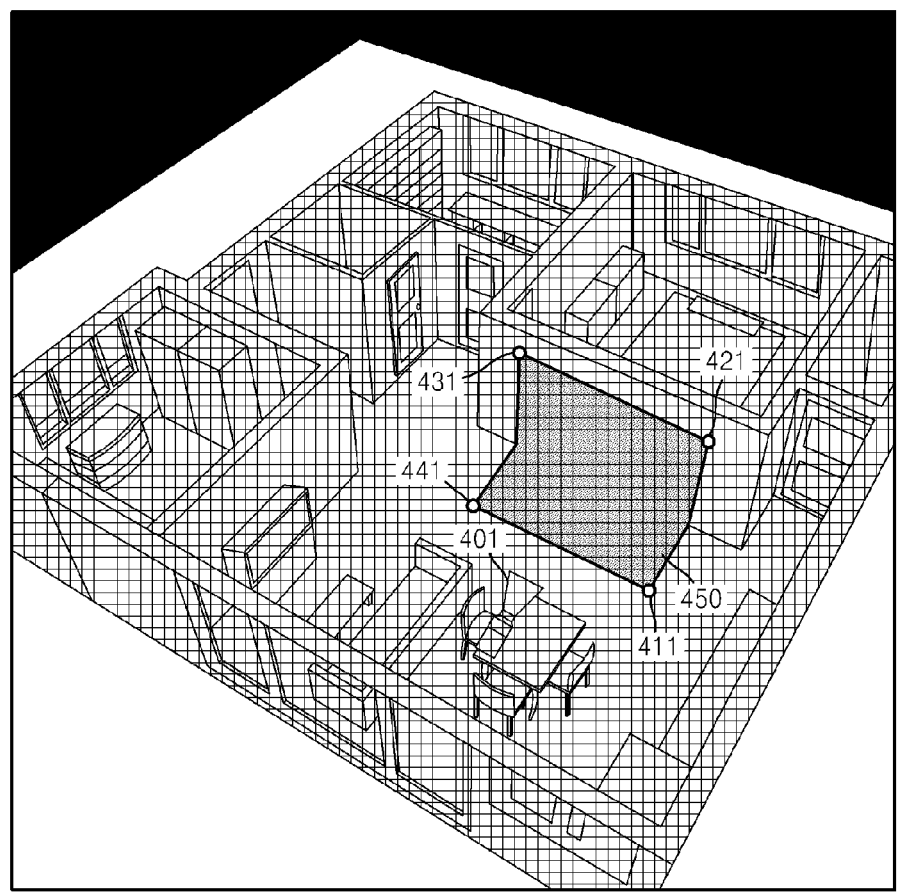

FIGS. 3 and 4 illustrate an operation of setting a nearest point of intersection according to exemplary embodiments.

In order to display an image captured using a real photographing apparatus, on a corresponding position on a 3D electronic map, an intersecting point between the captured image and a polygon constituting the 3D electronic map is extracted.

Referring to FIG. 3, a position of a virtual photographing apparatus 301, within the 3D electronic map, is determined. The position of the virtual photographing apparatus 301, within the 3D electronic map, may be implemented as a position corresponding to a position of a real photographing apparatus, within a real world environment modeled by the 3D electronic map.

The position of the real photographing apparatus may be determined in real-time via a global positioning system (GPS). If a photographing spot is changed or if the position of the real photographing apparatus is modified, the position of the virtual photographing apparatus 301 may be modified accordingly.

When the position of the virtual photographing apparatus 301 is determined, intersecting points between four virtual view angle vectors S310, S320, S330, and S340 and respective polygons constituting the 3D electronic map are also determined.

The four virtual view angle vectors S310, S320, S330, and S340 are implemented to correspond to view angle information of each view angle edge of a real photographing apparatus. View angle information, which is set in advance by the manufacturer, may be used as the view angle information of the real photographing apparatus. Alternatively, a user may set the view angle information of the real photographing apparatus.

Referring to FIG. 3, an intersecting point between the first virtual view angle vector S310 and a 3D polygon constituting the 3D electronic map is a point 311. Intersecting points between the second virtual view angle vector S320 and polygons constituting the 3D electronic map are points 321, 322, and 323. Intersecting points between the third virtual view angle vector S330 and polygons constituting the 3D electronic map are points 331, 332, and 333. An intersecting point between the fourth virtual view angle vector S340 and one of the polygons constituting the 3D electronic map is a point 341.

According to the current embodiment, from among the intersecting points along each of the first through fourth virtual view angle vectors S310, S320, S330, and S340 and intersecting with each of the polygons constituting the 3D electronic map in the virtual photographing apparatus 301, a nearest intersecting point of each of the first through fourth virtual view angle vectors S310, S320, S330, and S340 is determined. The intersecting points for determining the nearest intersecting points are with respect to the real photographing device 301, as represented by the virtual photographing device 301 in the 3D electronic map.

Referring to FIG. 3, a nearest intersecting point between the first virtual view angle vector S310 and the polygons constituting the 3D electronic map is the point 311. A nearest intersecting point between the second virtual view angle vector S320 and the polygons constituting the 3D electronic map is the point 321. A nearest intersecting point between the third virtual view angle vector S330 and the polygons constituting the 3D electronic map is the point 331. A nearest intersecting point between the fourth virtual view angle vector S340 and the polygons constituting the 3D electronic map is the point 341.

FIG. 4 illustrates nearest intersecting points 411, 421, 431, and 441 according to an exemplary embodiment.

According to the current embodiment, only pixels that are within a range of coordinates of the nearest intersecting points 411, 421, 431, and 441 are selected.

In detail, 3D coordinates of the nearest intersecting points 411, 421, 431, and 441 and 3D coordinates of pixels constituting the polygons that constitute the 3D map are compared. As a result of the comparison, pixels 450, which are within the range of the coordinates of the nearest intersecting points 411, 421, 431, and 441, are selected for display in the 3D map.

Figure 5:
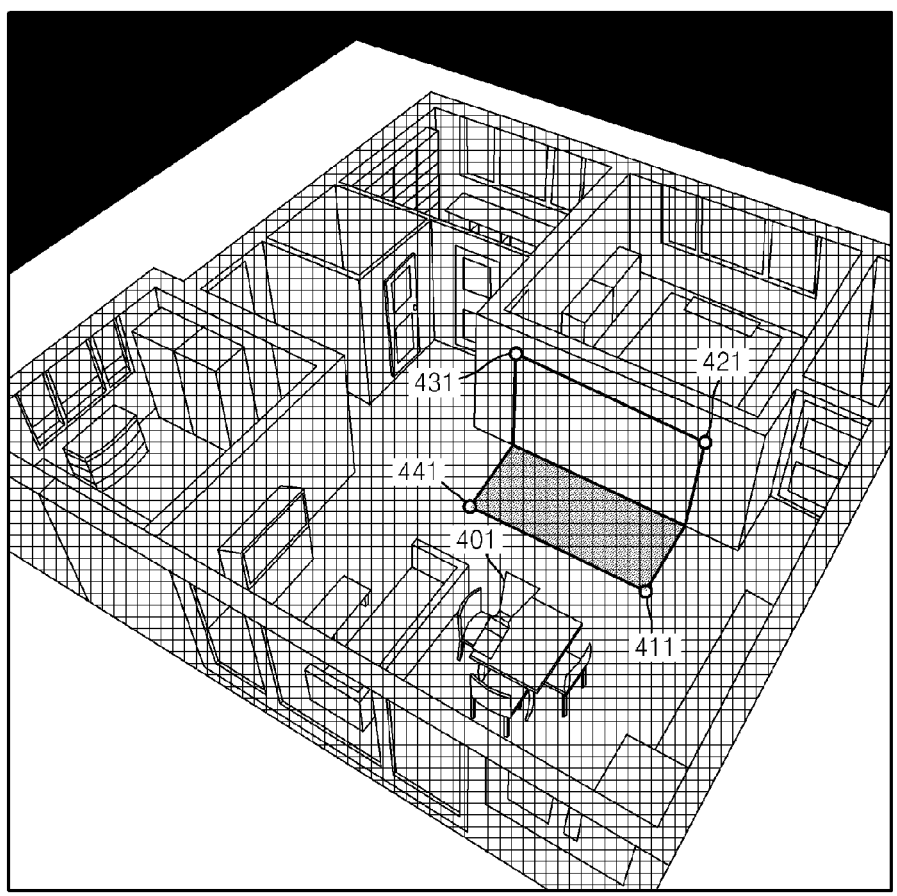
FIG. 5 illustrates an operation of modifying coordinates of three-dimensional (3D) pixels selected in the operation of FIG. 4 to two-dimensional (2D) coordinates according to an embodiment.

FIG. 5 illustrates an operation of modifying coordinates of 3D pixels selected in the operation of FIGS. 4 to 2D coordinates according to an exemplary embodiment.

The pixels selected on the 3D electronic map in FIG. 4 are marked as 3D coordinates, but to display these 3D coordinates on a 2D display, 2D coordinates are necessary. For the 2D coordinates, coordinates of a lattice illustrated in FIG. 5 may be used. Alternatively, the 2D coordinates may be modified by using other well-known methods in the art.

According to an exemplary embodiment, 3D coordinates and 2D coordinates, which are obtained by modifying the 3D coordinates, may be linked in relation to one another and stored in a storage unit.

After modifying 3D coordinates of the selected pixels to 2D, an image captured using a real photographing apparatus is superimposed on the selected pixels in real-time using the 2D coordinates of the selected pixels. Superimposing of the captured image is performed such that a texture of each frame of an input image is converted so as to correspond to the 2D coordinates of the selected pixels. According to the current embodiment, in order to superimpose a captured image on the 2D coordinates of the selected pixels, an image superimposing technique, such as Direct X, which is well-known in the related art, may be used. Then, after the captured image is superimposed on the 3D electronic map, the 3D electronic map is output on a display in real-time.

Figure 6:
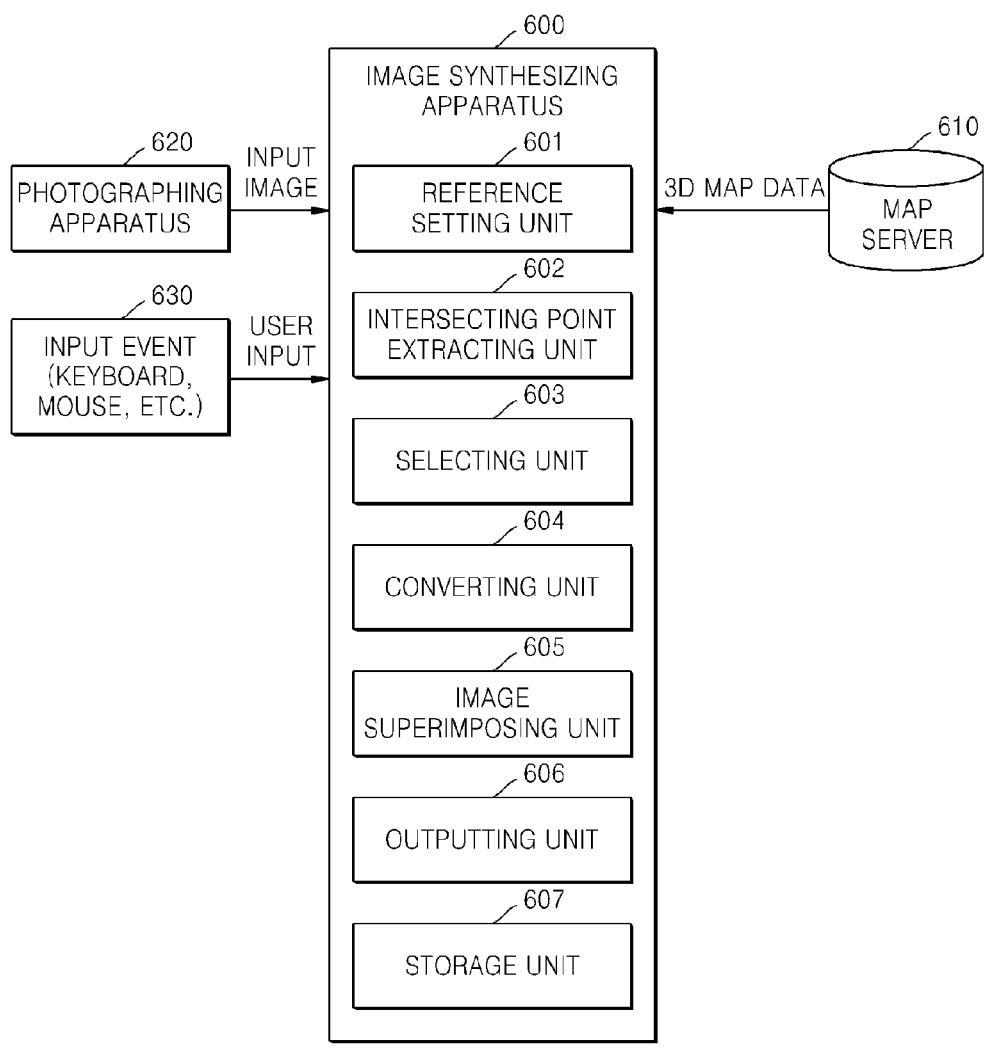
FIG. 6 is a structural diagram of a system that displays a captured image on a 3D electronic map according to an embodiment.

FIG. 6 is a structural diagram of a system that displays a captured image on a 3D electronic map according to an embodiment.

The system for displaying a captured image on a 3D electronic map includes an image superimposing apparatus 600, a map server 610, and a real photographing apparatus 620.

The map server 610 stores data of the 3D electronic map formed of polygons. The real photographing apparatus 620 is an apparatus that captures an image of a monitor area, and may be an image capturing apparatus, such as a camera, a smartphone, a video camera, a laptop computer, or a handheld apparatus.

By using the image superimposing apparatus 600, an image captured using the real photographing apparatus 620 is superimposed on a corresponding position on the 3D electronic map. The image superimposing apparatus 600 may be implemented such that data of the 3D electronic map is imported from the map server 610 to be stored in an internal buffer. Examples of the image superimposing apparatus 600 include a camera, a mobile phone, a smartphone, a tablet PC, a laptop computer, a computer, and a mobile terminal.

The image superimposing apparatus 600 includes a reference setting unit 601, an intersecting point extracting unit 602, a selecting unit 603, a converting unit 604, an image superimposing unit 605, and an outputting unit 606. The image superimposing apparatus may further include a storage unit 607.

The reference setting unit 601 determines a position of a virtual photographing apparatus. The virtual photographing apparatus corresponds to a real photographing apparatus. A position of the virtual photographing apparatus within the 3D electronic map may be implemented as a position, corresponding to a position of the real photographing apparatus within a real world environment modeled by the 3D electronic map.

The intersecting point extracting unit 602 extracts the nearest intersecting points of each of a plurality of,e.g.,four, virtual view angle vectors, with respect to polygons constituting the 3D electronic map, based on the position of the virtual photographing apparatus. FIGS. 3 and 4 may be referred to in regard to the operation of the intersecting point extracting unit 602.

The selecting unit 603 compares 3D coordinates of the nearest intersecting points against the 3D coordinates of pixels constituting the polygons that constitute the 3D map to select only pixels that are within a range of the coordinates of the nearest intersecting points. Referring to FIG. 4, only those pixels in the range of the nearest intersecting points 411, 421, 431, 441 are selected.

The converting unit 604 converts the 3D coordinates, of the pixels selected by the selecting unit 603, to 3D coordinates used in a 2D display. For example, the converting unit 604 may obtain 2D output coordinates by converting 3D coordinates via a view matrix on a 3D screen.

The image superimposing unit 605 superimposes an input image of the photographing apparatus 620 on the selected pixels by using the 2D coordinates of the pixels selected by the selecting unit 603. In this case, a final output image is obtained by converting a texture image of the input image of the photographing apparatus 620 in accordance with the 2D output coordinates that are obtained by converting the 3D coordinates by using the converting unit 604, and this final output image may be superimposed on the selected pixels. In this case, the input image may be superimposed while a captured image is displayed on the corresponding inbuilt 3D polygon, which is already a part of the 3D map as illustrated in FIG. 2.

Figure 7:
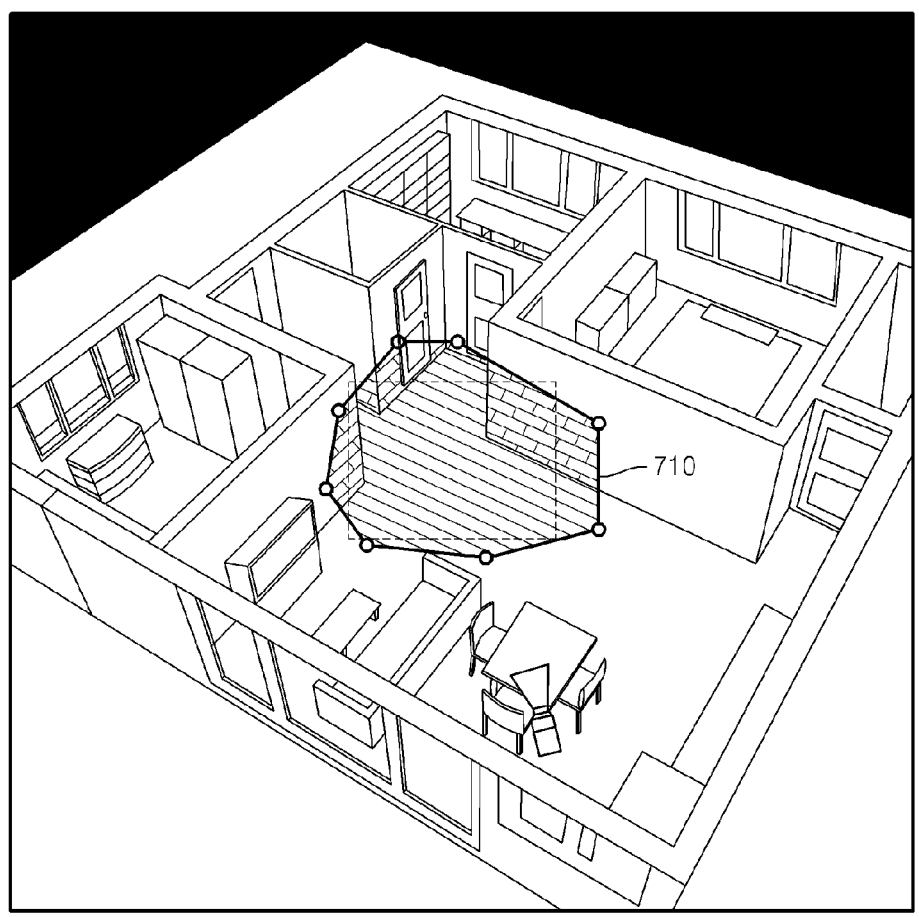
FIGS. 7 through 10 illustrate an operation of outputting a 3D electronic map including a superimposed image, by using an output unit, according to an embodiment.
Figure 8:
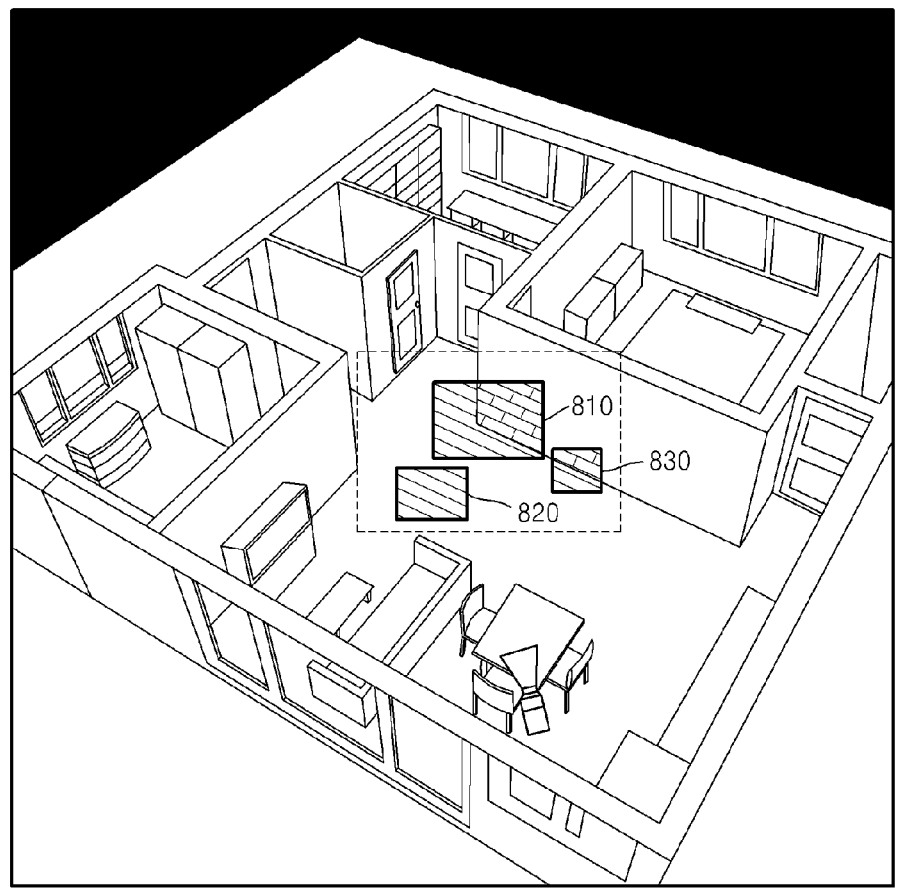
Figure 9:
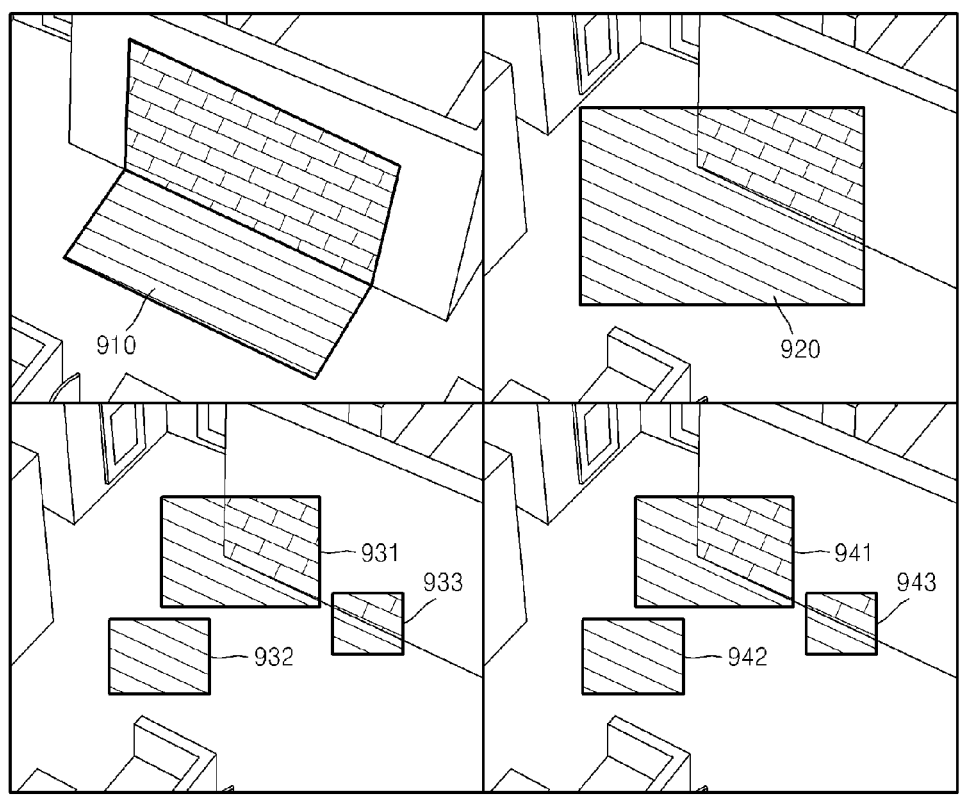

The output unit 606 outputs on a display, in real-time, the 3D electronic map including the superimposed image. As illustrated in FIGS. 7 through 9, an output range of the 3D electronic map output by using the output unit 606 may vary according to a user input 630. Examples of the user input 630 include a keyboard, a mouse, a stylus, and a finger.

The storage unit 607 may store 3D coordinate information used in the 3D electronic map and information of 2D coordinates which are obtained by converting the 3D coordinate information in order to display the 3D coordinate information on a 2D display.

FIGS. 7 through 10 illustrate an operation of using an output unit to output a 3D electronic map including a superimposed image according to an exemplary embodiment.

FIG. 7 illustrates an output range, which is designated as a polygonal shape 710 by a user. FIG. 8 illustrates an output range designated to predetermined parts 810, 820, and 830. FIG. 9 illustrates a display screen divided in multiple portions 910, 920, 931, 932, 933, 941, 942, and 943, so that a user may view multiple desired portions.

Figure 10:
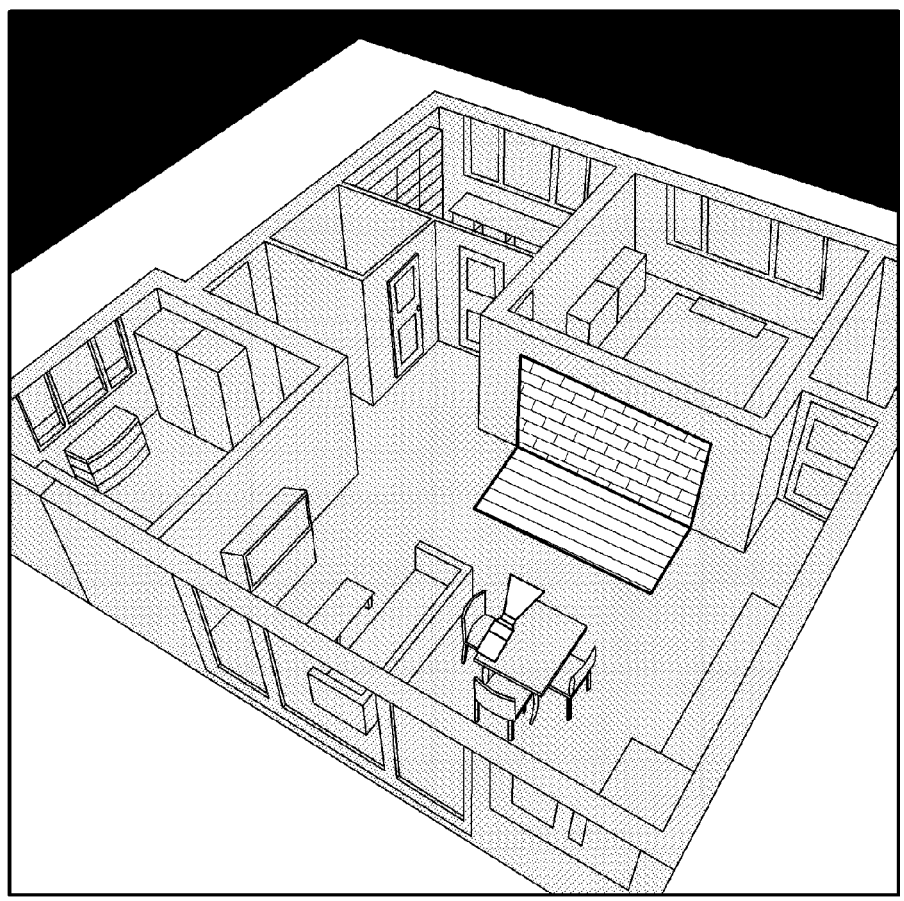

In addition, the output unit 605 may output the superimposed image on a display in real-time, such that only the superimposed image is highlighted in the 3D electronic map. For example, as illustrated in FIG. 10, areas not corresponding to the superimposed image may be made dark or semi-transparent, so that the superimposed image is highlighted.

Figure 11:
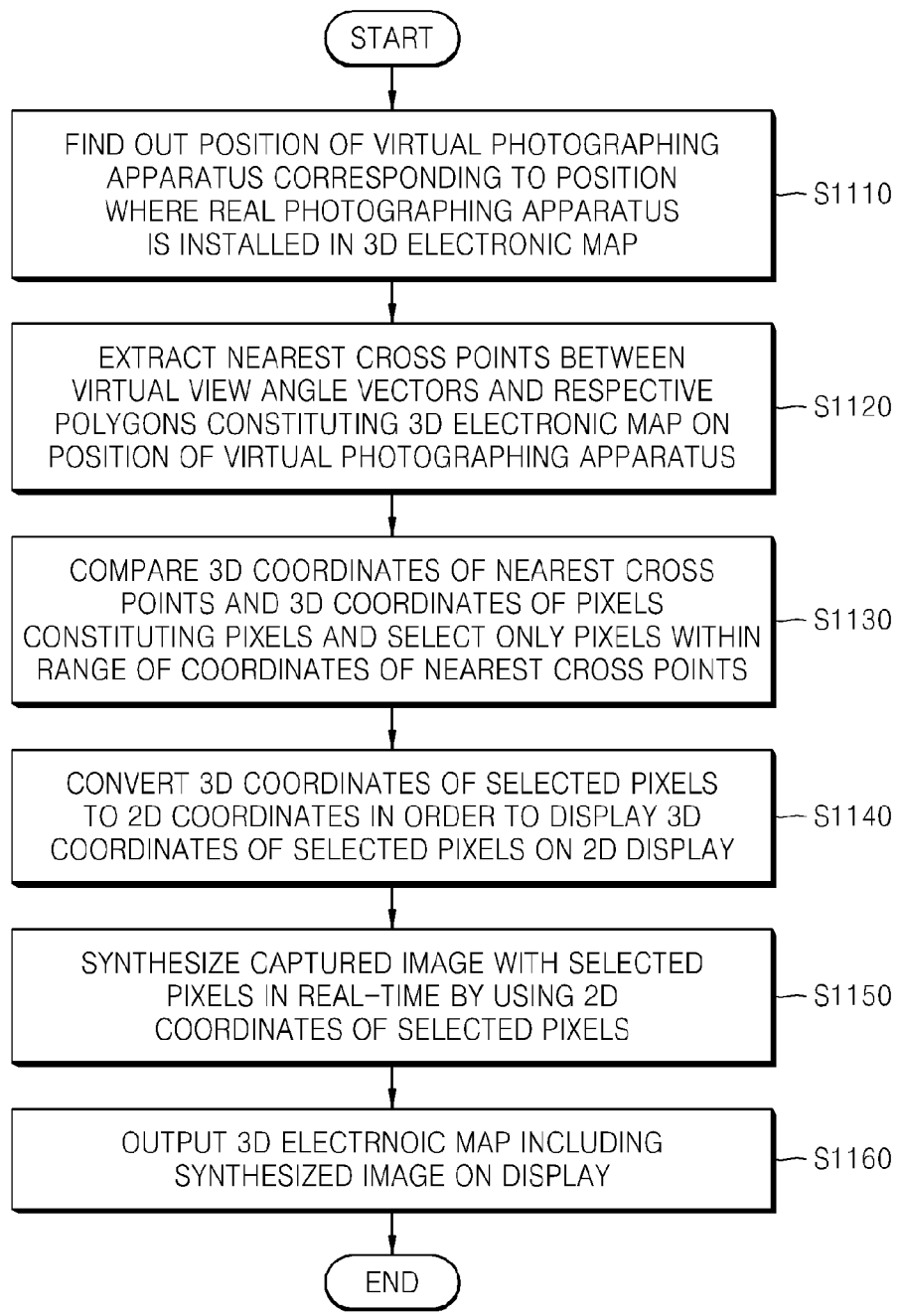
FIG. 11 is a flowchart illustrating a method of displaying a captured image on a 3D electronic map according to an embodiment.

FIG. 11 is a flowchart illustrating a method of displaying a captured image on a 3D electronic map, according to an exemplary embodiment. In operation 1110, a reference setting unit determines a position of a virtual photographing apparatus corresponding to a position of a real photographing apparatus within a real world environment modeled by the 3D electronic map.

In operation 1120, with respect to the position of the virtual photographing apparatus, an intersecting point extracting unit extracts nearest intersecting points between virtual view angle vectors generated based on view angle information of the virtual photographing apparatus and respective polygons constituting the 3D electronic map.

In operation 1130, a selecting unit compares 3D coordinates of the nearest intersecting points against 3D coordinates of pixels constituting the polygons that constitute the 3D map to select only pixels that are within a range of the coordinates of the nearest intersecting points.

In operation S1140, a converting unit converts the 3D coordinates of the selected pixels to 2D coordinates, so that the 3D coordinates may be represented as 2D on a 2D display.

In operation S1150, an image superimposing unit superimposes, in-real time, the captured image of the real photographing apparatus on top of the selected pixels using the 2D coordinates of the selected pixels. In operation S1160, an output unit outputs onto a display, in real-time, the 3D electronic map including the superimposed image.

Due to recent 3D technology, representations of geographical features and various objects on a map have become more realistic. According to the embodiments, a map of a monitor area and a monitor image may be closely coupled to each other, thereby increasing the effectiveness of monitoring.

Further, the exemplary embodiments can be embodied in different structural configurations. For example, any of the references setting unit 601, the intersecting point extracting unit 602, the selecting unit 603, the converting unit 604, the image superimposing unit 605, and the outputting unit 606 in FIG. 6 may include at least one processor, a circuit, or a hardware module.

The exemplary embodiments can also be embodied as computer readable codes on a computer readable recording medium. The computer readable recording medium is any data storage device that can store data that can thereafter be read by a computer system.

Examples of the computer readable recording medium include read-only memory (ROM), random-access memory (RAM), CD-ROMs, magnetic tapes, floppy disks, optical data storage devices, etc. (such as data transmission through the Internet). The computer readable recording medium can also be distributed over network coupled computer systems so that the computer readable code is stored and executed in a distributed fashion.

While the exemplary embodiments have been particularly shown and described, it will be understood by those of ordinary skill in the art that various changes in form and details may be made therein without departing from the spirit and scope of the exemplary embodiments as defined by the appended claims. The exemplary embodiments should be considered in descriptive sense only and not for purposes of limitation.

Therefore, the scope of the exemplary embodiments is defined not by the detailed description of the exemplary embodiments but by the appended claims, and all differences within the scope will be construed as being included in the exemplary embodiments.

What is claimed is:

1. A method of displaying a captured image onto a three-dimensional (3D) electronic map, the method comprising:

determining a position of a virtual photographing apparatus within the 3D electronic map based on a position of a real photographing apparatus in a real world environment;

determining nearest intersecting points in the 3D electronic map based on a plurality of virtual view angle vectors each of which originates from the virtual photographing apparatus and intersects with one of a plurality of polygons constituting the 3D electronic map at one of the nearest intersecting points, wherein the plurality of virtual view angle vectors are generated based on a view angle of the real photographing apparatus and the position of the virtual photographing apparatus in the 3D electronic map;

selecting pixels that are within a range of coordinates of the nearest intersecting points by comparing 3D coordinates of the nearest intersecting points and 3D coordinates of a plurality of pixels constituting the plurality of polygons;

converting 3D coordinates of the selected pixels to two-dimensional (2D) coordinates to display the selected pixels on a 2D display;

superimposing an image captured by the real photographing apparatus on top of the selected pixels, using the converted 2D coordinates of the selected pixels; and outputting, in real-time, the 3D electronic map, including the superimposed image, on the 2D display, wherein the view angle indicates a full extent of a view which is observable by the real photographing apparatus irrespective of an object seen in the view, and the plurality of virtual view angle vectors are directed at edges of a view which is seen from the position of the virtual photographing apparatus according to the view angle.

2. The method of claim 1, wherein the nearest intersecting points are positioned on the virtual view angle vectors and intersect selected polygons which are nearest to the real photographing apparatus or the virtual photographing apparatus among the polygons constituting the 3D electronic map.

3. The method of claim 1, wherein the plurality of virtual view angle vectors are used within the 3D electronic map and are formed of four vectors, and the each of the plurality of virtual view angle vectors has an angle corresponding to a view angle of the real photographing apparatus.

4. The method of claim 1, wherein 2D coordinates information and 3D coordinates information, which refer to coordinates information obtained by converting the 3D coordinates information used in the 3D electronic map to the 2D coordinates information to display the 3D coordinate information on the 2D display, are stored in advance in a storage unit, and the stored 2D coordinates information is used in the converting.

5. The method of claim 1, wherein a portion of the superimposed image may be designated by a user.

6. The method of claim 5, wherein areas not corresponding to the superimposed image within the 3D electronic map are made dark or semi-transparent to highlight the superimposed image.

7. The method of claim 1, wherein in the outputting, the 3D electronic map is output on the 2D display in real-time, such that only the superimposed image is highlighted in the 3D electronic map.

8. The method of claim 1, wherein at least two of the nearest intersecting points are positioned on different polygons.

9. A non-transitory computer readable recording medium having recorded thereon a program for executing the method of claim 1.

10. A non-transitory computer readable recording medium of claim 9, wherein the nearest intersecting points are positioned on the virtual view angle vectors and intersect selected polygons which are nearest to the real photographing apparatus or the virtual photographing apparatus among the polygons constituting the 3D electronic map.

11. An apparatus for displaying a captured image onto a three-dimensional (3D) electronic map, comprising:
- a reference setting device configured to determine a position of a virtual photographing apparatus within the 3D electronic map based on a position of a real photographing apparatus in a real world environment;
- an intersecting point extracting device configured to determine nearest intersecting points in the 3D electronic map based on a plurality of virtual view angle vectors each of which originates from the virtual photographing apparatus and intersects with one of a plurality polygons constituting the 3D electronic map at one of the nearest intersecting points, wherein the plurality of virtual view angle vectors are generated based on a view angle of the real photographing apparatus and the position of the virtual photographing apparatus in the 3D electronic map;
- a selecting device configured to select pixels that are within a range of coordinates of the nearest intersecting points by comparing 3D coordinates of the nearest intersecting points and 3D coordinates of a plurality of pixels constituting the plurality of polygons;
- a converting device configured to convert 3D coordinates of the selected pixels to two-dimensional (2D) coordinates of the selected pixels to display the selected pixels on a 2D display;
- an image superimposing device configured to superimpose an image captured by the real photographing apparatus on top of the selected pixels, wherein the superimposing device uses the converted 2D coordinates of the selected pixels; and
- an output device configured to output, in real-time, the 3D electronic map, including the superimposed image, on the 2D display,
- wherein the view angle indicates a full extent of a view which is observable by the real photographing apparatus irrespective of an object seen in the view, and the plurality of virtual view angle vectors are directed at edges of a view which is seen from the position of the virtual photographing apparatus according to the view angle.

12. The apparatus of claim 11, wherein the intersecting points are positioned on the virtual view angle vectors and intersect selected polygons which are nearest to the real photographing apparatus or the virtual photographing apparatus among the polygons constituting the 3D electronic map.

13. The apparatus of claim 11, further comprising a storage unit that stores 3D coordinates information used in the 3D electronic map and 2D coordinates information, wherein the 2D coordinates information is obtained by converting the 3D coordinates information to display the 3D coordinates information on the 2D display.

14. The apparatus of claim 11, wherein the position of the virtual photographing apparatus is a position within the 3D electronic map corresponding to the position of the real photographing apparatus, wherein the position of the real photographing apparatus is determined by a global positioning system (GPS).

15. The apparatus of claim 11, wherein the plurality of virtual view angle vectors are used in the 3D electronic map and are formed of four vectors, and the each of the plurality of virtual view angle vectors have an angle corresponding to a view angle of the real photographing apparatus.

16. A system for displaying a captured image onto a three-dimensional (3D) electronic map, comprising:
- a map server configured to store data of the 3D electronic map, wherein the 3D electronic map consists of a plurality of polygons;
- a real photographing apparatus configured to photograph a monitor area; and
- an image superimposing apparatus comprising the apparatus of claim 11 configured to superimpose an image captured by the real photographing apparatus with a position on the 3D electronic map.

17. The system of claim 16, wherein the intersecting points are positioned on the virtual view angle vectors and intersect selected polygons which are nearest to the real photographing apparatus or the virtual photographing apparatus among the polygons constituting the 3D electronic map.

18. The system of claim 16, wherein the position of the virtual photographing apparatus is a position within the 3D electronic map corresponding to the position of the real photographing apparatus, wherein the position of the real photographing apparatus is determined by global positioning system (GPS).

19. The apparatus of claim 16, wherein the plurality of virtual view angle vectors are used in the 3D electronic map and are formed of four vectors, and the each of the plurality of virtual view angle vectors have an angle corresponding to a view angle of the real photographing apparatus.

20. An apparatus for displaying a captured image onto a three-dimensional (3D) electronic map, comprising:
- at least one memory configured to store at least one computer program; and
- at least one processor configured to display the captured image onto the 3D electronic map by executing the computer program,
- wherein the computer program comprises instructions implementing the operations of:
  - determining a position of a virtual photographing apparatus within the 3D electronic map based on a position of a real photographing apparatus in a real world environment;
  - determining nearest intersecting points in the 3D electronic map based on a plurality of virtual view angle vectors each of which originates from the virtual photographing apparatus and intersects with one of a plurality of polygons constituting the 3D electronic map at one of the nearest intersecting points, wherein the plurality of virtual view angle vectors are generated based on a view angle of the real photographing apparatus and the position of the virtual photographing apparatus in the 3D electronic map;
  - selecting pixels that are within a range of coordinates of the nearest intersecting points by comparing 3D coordinates of the nearest intersecting points and 3D coordinates of a plurality of pixels constituting the plurality of polygons;
  - converting 3D coordinates of the selected pixels to two-dimensional (2D) coordinates of the selected pixels to display the selected pixels on a 2D display;
  - superimposing an image captured by the real photographing apparatus on top of the selected pixels, wherein the superimposing device uses the converted 2D coordinates of the selected pixels; and
  - outputting, in real-time, the 3D electronic map, including the superimposed image, on the 2D display, wherein the view angle indicates a full extent of a view which is observable by the real photographing apparatus irrespective of an object seen in the view, and the plurality of virtual view angle vectors are directed at edges of a view which is seen from the position of the virtual photographing apparatus according to the view angle.

* * * * *